United States Patent [19]

Burke et al.

[11] 3,906,656

[45] Sept. 23, 1975

[54] ANTI-COAGULANT BAIT PACKAGE FOR RODENTS INCLUDING METHODS OF MAKING AND USING SAME

[76] Inventors: Vincent D. Burke, 1258 Blair Ave., St. Paul, Minn. 55104; Kendrick A. Johnson, 8242 Queen Ave. South, Minneapolis, Minn. 55431

[22] Filed: Jan. 24, 1974

[21] Appl. No.: 436,117

[52] U.S. Cl. .................................................. 43/131
[51] Int. Cl.² ......................................... A01M 25/00
[58] Field of Search ............. 426/120, 410, 119, 97, 426/113, 114, 115; 43/131; 424/17, 359, 361

[56] References Cited
UNITED STATES PATENTS

| | | | |
|---|---|---|---|
| 1,161,537 | 11/1915 | See | 43/131 |
| 2,813,058 | 11/1957 | Smith | 167/46 |
| 3,032,915 | 5/1962 | Giroud-Abel | 43/131 |
| 3,075,639 | 1/1963 | Lingley | 206/43 |
| 3,468,099 | 9/1969 | Vogt | 53/140 |

*Primary Examiner*—Louis G. Mancene
*Assistant Examiner*—Peter K. Skiff
*Attorney, Agent, or Firm*—Stuart R. Peterson

[57] ABSTRACT

The method of making the poisoned bait for exterminating rodents includes the step of packaging pellets composed of flour and an anti-coagulant substance so that each pellet is contained within an individual compartment or cell. In the forming of the individual compartments or cells, sheets of thermoplastic material are utilized and are adhered together so that the two sheets collectively envelop the various pellets. The plastic material, such as polyethylene, is normally impervious to moisture and forms a highly effective moisture barrier for each pellet. Consequently, when the package is employed for the extermination of rodents, the various pellets are protected from adverse atmospheric influences, particularly moisture, by reason of their sealed condition within the various compartments or cells. Hence, when exterminating rodents, the packaged pellets can be placed in damp moisture-laden environments, such as in municipal sewers, with the general assurance that each pellet will be preserved until opened. When a rodent tears through the sheet material to gain access to a given pellet, only that particular pellet becomes exposed. The remaining pellets are left intact within their respective compartments or cells until a rodent later tears open that particular compartment or cell.

13 Claims, 4 Drawing Figures

US Patent   Sept. 23, 1975   3,906,656
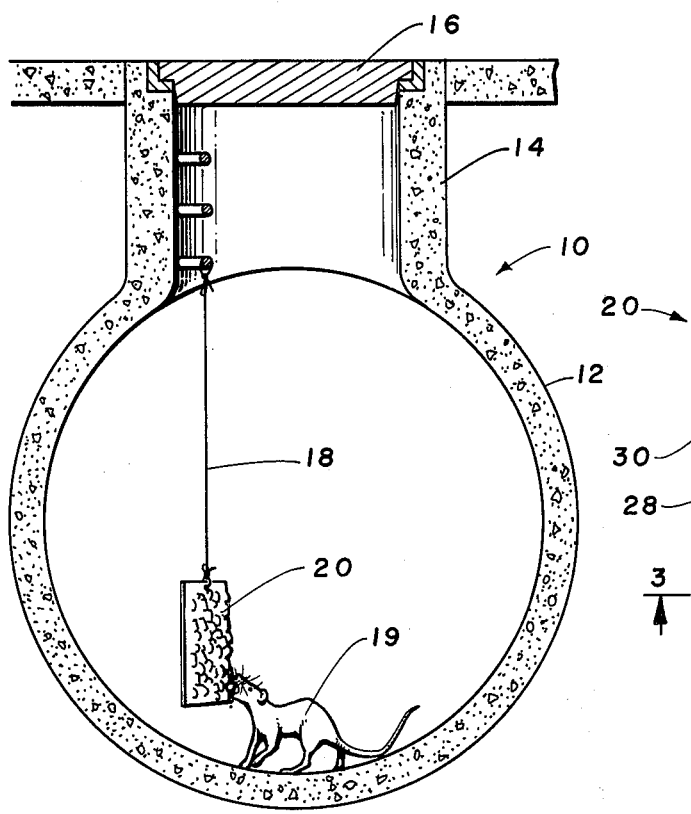
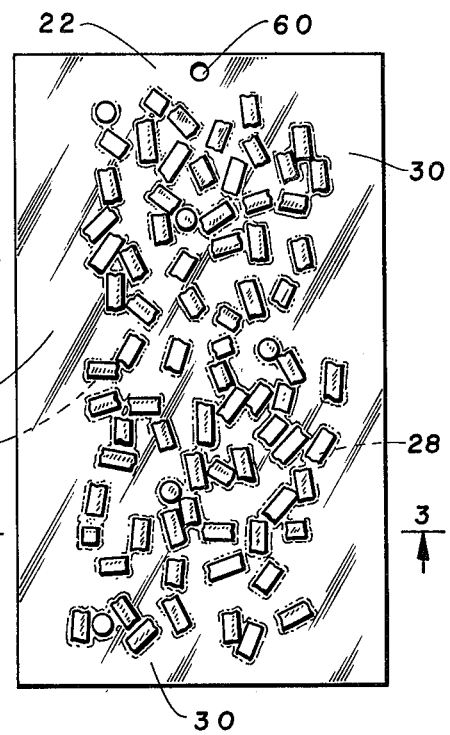
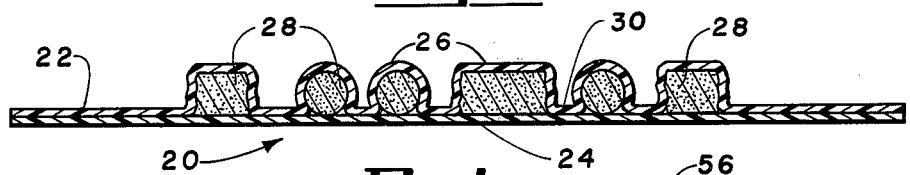
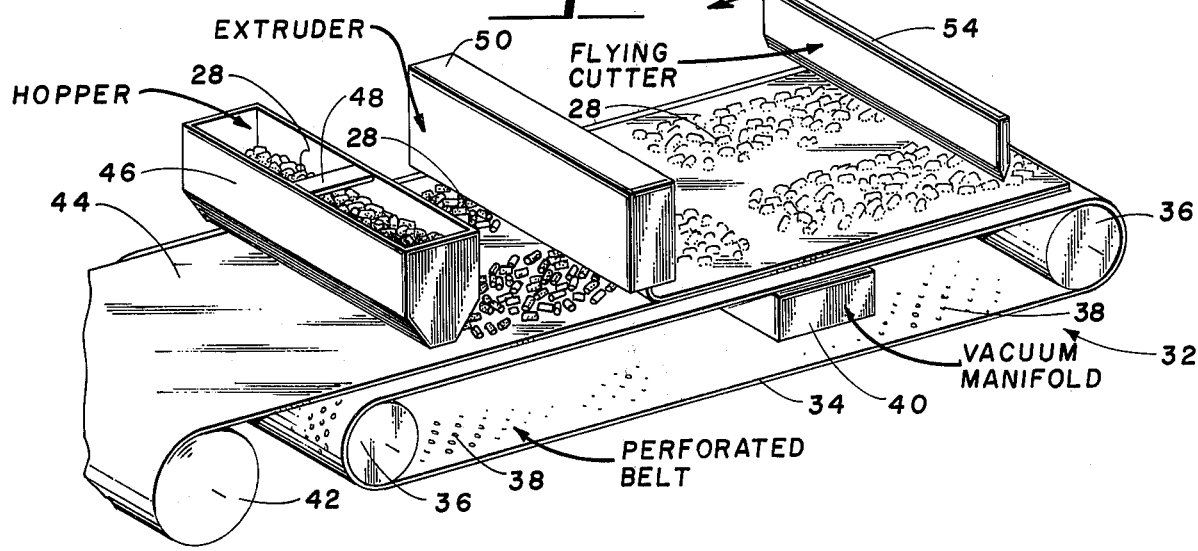

ANTI-COAGULANT BAIT PACKAGE FOR RODENTS INCLUDING METHODS OF MAKING AND USING SAME

BACKGROUND OF THE INVENTION

1. Field of the Invention

This invention relates generally to the exterminating of rodents by means of poisoned bait, and additionally pertains both to the packaging of the bait and the manner in which the packaged bait is subsequently utilized in the destruction of rodents.

2. Description of the Prior Art

Owing to the severity of the rodent problem, a number of exterminating methods and devices have been contrived in the past. These arrangements have met with varying degrees of success. Inasmuch as the most effective bait involves the use of a flour base serving as an inert carrier for the poison a deterioration of the bait from moisture has been a drawback that has not been completely overcome. For one thing, if a bag or tube of poisoned food is employed, such as has been done in the past, once the rodent has opened such a container, then the bait that remains is subjected to atmospheric conditions. Where such conditions involve moisture-laden air, it follows that there is a rapid deterioration of the bait from the time that the container has been torn open. Also, when a number of pellets are packaged in a single bag or container, the opening of the bag will usually result in spillage of the remainder. Not only is this wasteful, but where the bait is employed in situations where children and domestic animals are present, then the danger of the children and domestic animals consuming some becomes critical and must be controlled. Proper monitoring or surveillance of the infested area is frequently difficult.

SUMMARY OF THE INVENTION

Accordingly, an important object of the present invention is to provide packaged poisonous bait that will be highly moisture-resistant and in which its capability to resist moisture will not be diminished by reason of some of the bait being opened. More specifically, an aim of the invention is to package individual anti-coagulant bait pellets between layers, sheets or coatings of appropriate plastic material, this resulting in a plurality of individual compartments or cells, so that when one such cell is torn open by a rodent, the remaining cells will remain unopened so that they continue to function to protect and preserve the pellets contained therein. Not only is the poisoned bait preserved when being used to exterminate rodents, but its shelf life is also appreciably lengthened.

Another object is to avoid spillage, the individual packaging concept herein employed obviating such a happening.

Another object is to provide a packaged poison bait that will be difficult for children to open, this being by reason of the individual pellet being completely enveloped by plastic material. More specifically, a child might attempt to detach a given pellet but is thwarted from doing so because of the manner in which it is wrapped. In this regard, the pellets, while readily available to rodents, cannot be detached easily, such as by a child's fingers.

A further object of our invention is to encase the various poisoned bait pellets in a moisture-resistant manner, yet enable the rodent to smell the bait. In this regard, the plastic material that forms the individual compartment or cell is inherently porous to the degree needed to permit the odor of the bait to pass outwardly therethrough but to prevent moisture from entering. Stated somewhat differently, the pores present in the plastic are of such a minute size that the surface tension of the moisture inhibits inward passage of moisture to the compartments or cells containing the various pellets, but still allowing the escape of odors.

Yet another object of the invention is to provide a highly efficient method of packaging poisoned bait for destroying rodents, the packaging technique lending itself readily to mass production and a concomitant reduction in production costs.

Still another object is to provide packaged poisoned bait that will be visible to the rodent from virtually any direction. In this regard, it is within the contemplation of the invention to utilize transparent or translucent plastic material that will not only render the bait visible but will not frighten or deter the rodent from wishing to gain access thereto.

Briefly, our invention involves the initial packaging of individual pellets so that each is contained in its own compartment or cell, being completely surrounded by plastic material. Hence, when employing the method of exterminating that is within the purview of our invention, any one pellet that might be opened does not result in the opening of any other pellet, this being due to the fact that each one is packaged separately from the others. Insofar as the packaging process in concerned, the poisoned bait pellets can be distributed at random on the substrate sheet as this sheet passes beneath a hopper in which the pellets are stored. The superimposing of a thermoplastic sheet or film thereover results in each pellet being completely encapsulated. Because of the individual wrapping of each pellet, the bait has an exceptionally long shelf life and of course is not subjected to deleterious conditions when being used to exterminate rodents.

BRIEF DESCRIPTION OF THE DRAWINGS

FIG. 1 is a sectional view of a typical sewer utilizing my method of exterminating rodents;

FIG. 2 is a side elevational view of the package appearing in FIG. 1, the scale being appreciably increased;

FIG. 3 is a sectional view taken in the direction of Line 3—3 of FIG. 2 for the purpose of showing the individual compartments or cells that result when utilizing the teachings of our invention, the scale being approximately twice that used in FIG. 2, and FIG. 4 is a perspective view illustrating apparatus employed in my method of packaging the bait.

DESCRIPTION OF THE PREFERRED EMBODIMENT

Attention is first directed to FIG. 1 in which a typical sewer 10 has been shown in cross section. While the sewer 10 is not actually a part of our invention, rodents, particularly rats, are prone to inhabit such damp environments where they will eat the garbage in the sewage if nothing more attractive is found. At any rate, the sewer 10 illustrated in FIG. 1 includes the underground conduit 12 through which the sewage flows, a manhole 14 leading downwardly thereinto, and the customary manhole cover 16.

Suspended within the sewer 10 by means of a cord or wire 18 is our poisoned bait package which has been denoted generally by the reference numeral 20. A rat 19 appears beneath the package 20 in FIG. 1. As best understood from FIGS. 2 and 3, the package 20 is comprised of two sheets or film 22, 24 of pastic material. A thermoplastic material that has been found highly satisfactory in actual use is polyethylene; this plastic possesses very good flow capabilities, and additionally has very good skin wrapping qualities.

FIG. 3 illustrates the various compartments or cells 26 that contain the various poisoned bait pellets 28. In other words, when following the teachings of our invention, the layer or sheet 22 that confronts the other sheet 24 is literally stretched during the shrinking process so as to completely envelop each of the pellets 28. The regions or areas between the encapsulated pellets have been collectively denoted by the reference numeral 30. The areas 30 are secured together in a face-to-face relationship, the portions that encompass or embrace the pellets simply being skin wrapped over the pellets 28 so as to seal and protect each pellet in its individual compartment or cell 26.

It is very important to appreciate that each compartment or cell 26 is separate and distinct from the other, so that when a pellet 28 is removed, this being when a rodent tears away part of the sheets of material 22, 24, then only that particular pellet becomes exposed. The others are unaffected until the material surrounding them is torn away. In this way, moisture cannot contact a given pellet until the plastic material surrounding it has been removed. When a particular pellet 28 is in this way opened, it will be quickly consumed by the rodent and no time exists for it to deteriorate as a result of any exposure to moisture-laden air. Because of this feature, the package has particular utility in damp environments, such as in underground sewers. If desired, however, the package 20 can be located virtually any place where rodents are found and are to be exterminated.

Since the pellets 28 are removed only one at a time, there can be no spillage, as would be the case if pellets were packaged in bulk or loose form within a bag, tube or other container. In such a prior art situation, the opening of the container by a rodent gnawing through a wall thereof would permit the pelletized bait to fall out. Not only does this result in deterioration of the bait but it becomes immediately available to children, as well as domestic animals.

While the specific composition of the pellets 28 is relatively unimportant to obtaining the advantages from our invention, it is important to recognize that anticoagulant bait normally has an inert carrier, usually a groundup granular product, i.e. flour, which is vulnerable to moisture. Consequently, the flour base or carrier has the appropriate anti-coagulant chemical added thereto to achieve hemorrhaging, such a substance suggestively being Deiphacine or Prolin (formerly Wharfin). In the forming of the pellets 28, the flour is simply mixed with whatever toxic substance is selected and then the mixture is extruded into cylindrical strips having a diameter of approximately ⅜ inch. However, ⅛, ¼ or ½ inch diameters are also satisfactory. The strips as they leave the extruder are broken into rod-like sections of irregular length, these sections being the pellets 28. Although the pellets 28 vary as far as their lengths are concerned, this does not detract from the invention in any way because the forming of the compartments or cells 26 does not depend upon any definite length for the pellets. In other words, the invention is able to accommodate pellets 28 of virtually any length (from ¼ to over 1.0 inch) and actually any cross section (although ⅜ inch has been mentioned as a specific diameter size that has been used in actual practice). It is believed that the immateriality as far as the pellet length is concerned will become evident when considering the following method used in packaging the pellets.

Turning now to the method employed in the packaging of the pellets 28, it will be observed in FIG. 4 that the apparatus there illustrated has been generally denoted by the reference numeral 32. The apparatus 32 comprises an endless conveyor belt 34 entrained over rollers 36, one of which is driven by a suitable motor (not shown). The belt 34 is formed with numerous apertures 38. In this way, when the upper flight of the belt 34 (although it can be a screen) passes over a vacuum manifold 40, that section immediately above the vacuum manifold 40 will be subjected to a subatmospheric pressure for a purpose presently to be made manifest. A substrate supply roll 42 is provided and to provide a substrate sheet 44 of thermoplastic material, such as the already suggested polyethylene. In the exemplary situation, it can be assumed that the width of the substrate or sheet 44 is twice the width of the package 20 appearing in FIG. 2. However, the width of the substrate or sheet 44 can be the same width as the package. In other words, dimensions are virtually immaterial and will be dictated largely by marketing requirements.

The various pellets 28 are stored in a hopper 46 and during appropriate intervals, the bottom of the hopper 46 is opened so that the pellets 28 fall gravitationally onto the top of the substrate sheet 44 as it is drawn from its supply roll 42. It is preferred that the hopper 46 be opened only intermittently in order to enable the resulting product to be cut as will become apparent shortly. Still further, if the package 20 is to have only half the width of the sheet 44, then the hopper 46 should have a divider 48 to facilitate subsequent longitudinal cutting.

Next to be referred to is the extruder 50. Although not illustrated, it will be appreciated that the extruder receives a supply of molten plastic, in this instance polyethylene, and by reason of a nozzle opening or slit in the bottom thereof, a thin sheet or film 52 is extruded, this sheet or film having the same width as the substrate sheet 44. Actually, the film 52 corresponds to the sheet labeled 22 in FIG. 3 and the substrate sheet 44 to the sheet 24 in the final product or package 20.

Various small apertures or perforations are provided in the substrate sheet 44. When the two sheets 44, 52 are over the vacuum manifold 40, then the upper sheet or film 52 is sucked or pulled downwardly against the lower or substrate sheet 44. This causes the upper sheet or film 52 to envelop the various pellets 28, the film being drawn tightly thereabout to form the various compartments or cells 26 shown in FIG. 3. Owing to the molten condition of the film 52, it adheres to the substrate sheet 44 in the areas labeled 30. The small holes 38 in the conveyor belt 34 together with the small holes or apertures in the substrate sheet 44 enabling this. The tiny holes in the sheet 44 are literally plugged up by the still molten thermoplastic film material 52 overlying the substrate sheet. Hence, when the film 52 cools, it is securely adhered to the substrate sheet 44 and the individual cells or compartments 26 (FIG. 3) are formed completely separate from each other. As already explained, the individual cell concept is an important feature of the invention, for each cell has to be opened in order to expose the pellet 28 contained therein. Hence, only one pellet 28 is exposed to the atmosphere at any given time in contradistinction to having a number of pellets exposed as in the prior art.

After the two sheets 44, 52 have been permanently adhered to each other, as quickly takes place by cooling, the combined or now attached sheets 44, 52 continue on the conveyor belt 34. At an appropriate location, a flying cutter 54 is utilized to transversely cut or sever the resulting product into the individual packages 20, such as the one appearing in FIG. 2 (and also the one hanging in FIG. 1). It is not deemed necessary to illustrate the mechanism that enables the cutter 54 to move in a synchronized relation with the conveyor belt and the product carried thereon during the cutting operation. However, it will be helpful, it is believed to apply the double-headed arrow 56 which indicates the rectilinear or horizontal reciprocation of the flying cutter 54. The vertical or cutting movement thereof has been indicated by the double-headed arrow 58. When the sheet material 44, 52 is twice the desired width of the package 20, then a subsequent longitudinal cutting operation is resorted to, but this is unimportant to understanding the present invention. Likewise, where a hole 60 is to be used for hanging the package 20, such a hole can be punched later.

The method of packaging that has just been described does not require that the pellets 28 be of any given length. Consequently, the irregular length that results from the extrusion utilized in the making of the pellets, does not in any way adversely affect the packaging operation. Irrespective of the pellet length the plastic film 52 is drawn downwardly so as to tightly fit over each pellet 28. Still further, it is to be noted that the random orientation of the pellets 28 that is most readily realized is not detrimental in any sense of the word to the packaging thereof. It must be remembered that each compartment or cell 26 is a separate pod-like chamber and completely surrounds the particular pellet 28 contained therein.

We claim:

1. An anti-coagulant bait package for exterminating rodents comprising first and second layers, at least said first layer being of a flexible material, and a plurality of anti-coagulant bait pellets, said first layer confronting said second layer and secured thereto in areas between pellets so as to form individual compartments or cells which completely envelop said pellets, each compartment or cell containing a pellet whereby the tearing of either layer by rodents in gaining access to a particular pellet does not open and destroy the individuality of the compartments or cells containing the other pellets.

2. An anti-coagulant bait package in accordance with claim 1 in which said first layer is a sheet of thermoplastic material which engages the major surface of each pellet to completely envelop same and is sealed to said second layer in said areas between pellets where said pellets are not engaged by said first layer.

3. An anti-coagulant bait package in accordance with claim 2 in which said second layer is also a sheet of thermoplastic material.

4. An anti-coagulant bait package in accordance with claim 3 in which said pellets contain an anti-coagulant substance mixed with a flour or grain-derived carrier, the first and second layers of material which form the individual compartments or cells providing a moisture barrier that minimizes the likelihood of moisture entering into said compartments or cells through said first and second layers.

5. An anti-coagulant bait package in accordance with claim 4 in which said pellets are randomly distributed.

6. An anti-coagulant bait package in accordance with claim 5 in which said pellets vary in length.

7. An anti-coagulant bait package in accordance with claim 6 in which said pellets are generally cylindrical.

8. A method of exterminating rodents comprising the step of supplying a collection of anti-coagulant bait pellets in individual compartments or cells, each compartment or cell being formed at least in part by a sheet of plastic material, and placing said collection in a moisture-laden environment frequented by rodents, whereby the opening of one compartment by a rodent will not result in an opening of any of the other compartments so that the pellets contained in the other compartments or cells are retained in place and protected from the atmosphere.

9. A method of exterminating rodents in accordance with claim 8 in which said compartments or cells are formed between two plastic sheets, one of which is a thermoplastic film sufficiently flexible so as to individually envelop each pellet independently of the other pellets so that each pellet is preserved until its particular cell is opened by a rodent.

10. A method of exterminating rodents in accordance with claim 9 including the additional step of suspending said sheets from an overhead vantage point in an underground sewer.

11. A method of exterminating rodents in accordance with claim 8 in which said sheet is transparent or translucent so that the pellets are visible to rodents.

12. A method of exterminating rodents in accordance with claim 11 including a second sheet of transparent or translucent material, said sheets jointly forming said compartments or cells and rendering said pellets visible from either side.

13. An anti-coagulant bait package in accordance with claim 1 in which said first layer is a sheet of polyethylene plastic.

* * * * *